United States Patent [19]

Morishita et al.

[11] Patent Number: 4,757,869
[45] Date of Patent: Jul. 19, 1988

[54] MOTOR-DRIVEN POWER STEERING SYSTEM FOR A VEHICLE

[75] Inventors: Mitsuharu Morishita; Tadayuki Hara; Shinichi Kohge, all of Himeji; Koji Terauchi, Akashi, all of Japan

[73] Assignee: Mitsubishi Denki Kabushiki Kaisha, Japan

[21] Appl. No.: 22,211

[22] Filed: Mar. 5, 1987

[30] Foreign Application Priority Data

| Mar. 19, 1986 | [JP] | Japan | 61-63479 |
| Mar. 19, 1986 | [JP] | Japan | 61-63480 |
| Mar. 19, 1986 | [JP] | Japan | 61-63482 |
| Mar. 19, 1986 | [JP] | Japan | 61-63483 |
| Mar. 19, 1986 | [JP] | Japan | 61-63484 |
| Mar. 19, 1986 | [JP] | Japan | 61-63487 |

[51] Int. Cl.⁴ .............................................. B62D 5/04
[52] U.S. Cl. ............................... 180/79.1; 364/424
[58] Field of Search .................. 180/79.1, 148, 142; 74/388 PS, 498; 364/424

[56] References Cited

U.S. PATENT DOCUMENTS

| 4,538,698 | 9/1985 | Hashimoto et al. | 180/79.1 |
| 4,577,715 | 3/1985 | Saito | 180/79.1 |
| 4,651,840 | 3/1987 | Shimizu et al. | 180/79.1 |
| 4,660,669 | 4/1987 | Shimizu | 180/79.1 |

FOREIGN PATENT DOCUMENTS

| 148664 | 7/1985 | European Pat. Off. | 180/79.1 |
| 3542033 | 6/1986 | Fed. Rep. of Germany | 180/79.1 |
| 55-44013 | 3/1980 | Japan . | |
| 57-99468 | 6/1982 | Japan . | |
| 59-50864 | 3/1984 | Japan . | |
| 59-87376 | 6/1984 | Japan . | |

Primary Examiner—John A. Pekar
Attorney, Agent, or Firm—Leydig, Voit & Mayer

[57] ABSTRACT

A motor-driven power steering system for a vehicle preventing transmission of operating noises of the motor to the interior of the passenger compartment of the vehicle and for suppressing the generation of radio wave noises: a speed sensor for detecting the travelling speed of the vehicle; a torque sensor mounted on a steering shaft for detecting turning force imparted to the steering wheel by an operator, a first pinion operatively connected with the steering shaft and adapted to be driven by the steering wheel through the intermediary of the steering shaft, a rack operatively connected through tie rods with a pair of steerable road wheels and having a first rack tooth portion and a second rack tooth portion formed thereon, a second pinion being in meshing engagement with the second rack tooth portion on the rack, a motor operatively connected with the second pinion for power assisting the steering motion of the rack induced by the operator a first electromagnetic clutch interposed between the motor and the second pinion for transmitting power therebetween substantially in proportion to the intensity of current supplied thereto, a second clutch interposed between the motor and the second pinion for selectively establishing or disconnecting the operative connection between the motor and the second pinion, and a control unit adapted to receive output signals from the speed sensor and the torque sensor for controlling the operations of the motor, the first clutch and the second clutch.

21 Claims, 17 Drawing Sheets

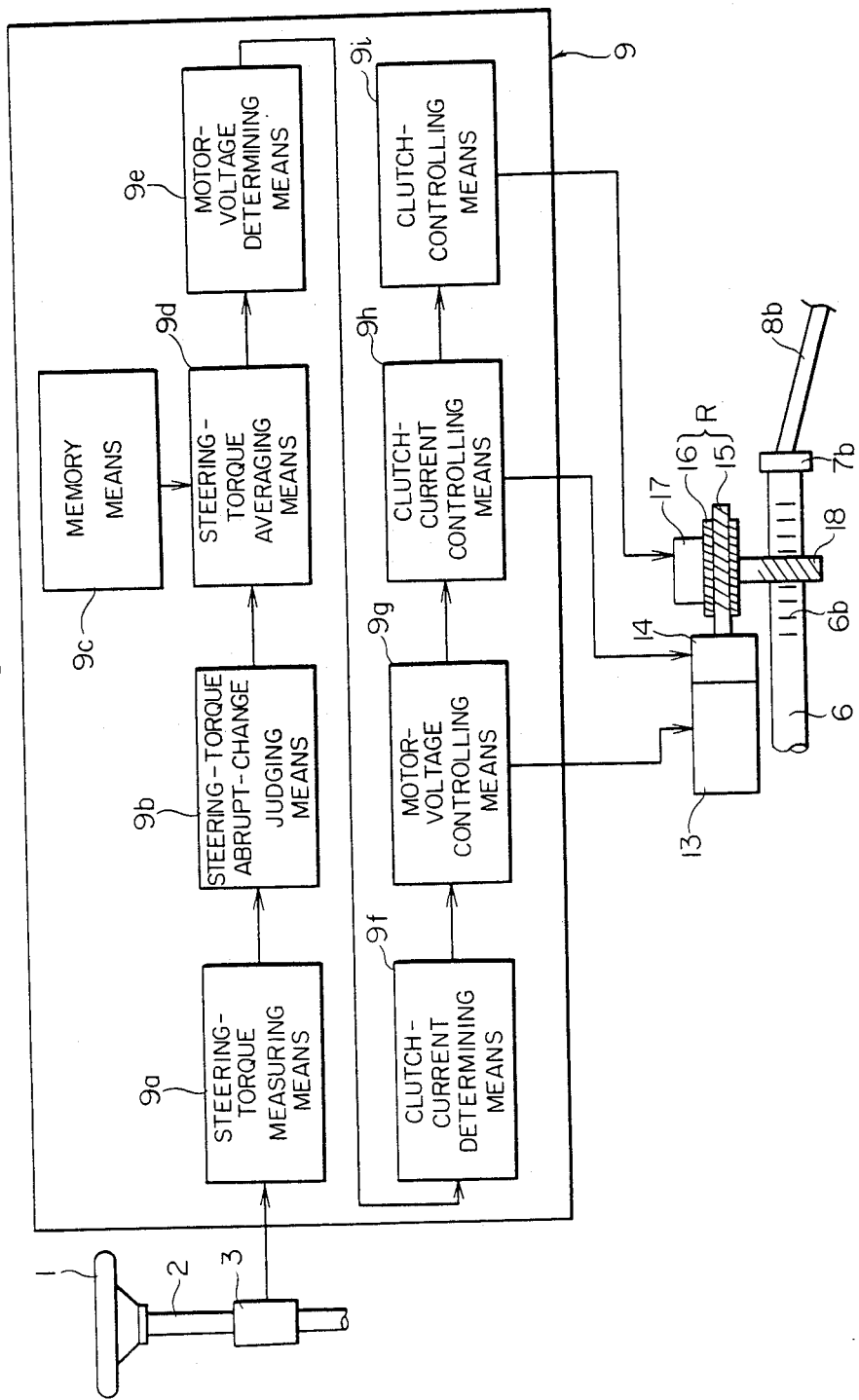

MOTOR-DRIVEN POWER STEERING SYSTEM FOR A VEHICLE

BACKGROUND OF THE INVENTION

1. Field of the Invention

This invention relates to a motor-driven power steering system for a vehicle adapted to assist the operator-induced steering by means of the rotating force of a motor.

2. Description of the Prior Art

In the past, a conventional power steering system of this type has hitherto been known in which the driving force of a motor is transmitted through a speed-reduction gear to a steering shaft by means of gears or belts so as to assist the steering operation of the steering wheel exerted by an operator. In such a conventional power steering system, the motor is usually disposed inside the passenger compartment due to lay-out restraints, or when it is disposed in an appropriate place outside the passenger compartment such as, for example, in the engine compartment, the motor is operatively connected with the steering shaft through a flexible wire, a universal joint or the like.

The conventional power steering system as constructed above is disadvantageous in that when the motor is disposed inside the passenger compartment, the disturbing operating noises of the motor are directly transmitted to the operator. Also, in cases where the motor is disposed outside the passenger compartment and connected to a steering shaft through a flexible wire, a great deal of noise will generally be produced. Further, when using universal joints, there will be no noise generated but instead there will be irregularities in the torque transmitted so that the assistance afforded to a steering shaft by the motor will become irregular, thus impairing smooth power-steering operation. Moreover, due to time lags in response of the speed-reduction gear and/or the power transmission mechanism, the power steering system is liable to be caused to vibrate, generating irregularities in steering torque and/or impulses. Furthermore, at the beginning of a fast steering operation, or when countersteering, there will be drag or heavy steering feeling due to time lags in the rise of the operation of the motor. As a result, smooth steering is further impaired.

On the other hand, in another type of power steering system, a further or auxiliary pinion shaft is provided separately from the usual pinion shaft connected with a steering wheel. This auxiliary pinion shaft is operatively connected with a motor for driving a racked steering shaft engaging therewith so that the auxiliary pinion shaft is driven to rotate by means of the motor through the intermediary of a speed-reduction gear. In this power steering system, however, it is necessary to control motor torque with respect to the rotational force of the steering wheel wherein radio wave noises will be produced during heavy current chopper contro. Moreover, in cases where a vehicle is travelling at more than intermediate speeds and can be steered lightly without any assistance from the motor, or where the motor fails to rotate properly due to circuit trouble, or where the steering speed is increased to a value greater than the rotational speed or rpm of the motor under no load during a fast steering operation, the motor with a speed-reduction gear will become a load having a speed-increasing mechanism when the steering shaft is to be rotated by the steering wheel so that the inertia of the motor armature impairs followability of the steering system as a whole, thus requiring greater steering torque.

SUMMARY OF THE INVENTION

In view of the above, the present invention is intended to obviate the above-described problems of the prior art.

A primary object of the present invention is to provide a novel and improved motor-driven power steering system capable of preventing transmission of operating noises of a motor to the interior of a passenger compartment as well as suppressing the generation of radio wave noises in an effective manner, and in which manual steering can be made without undue effort so as to ensure operational safety during travel of a vehicle in case of a failure in the power assisting operation.

Another object of the present invention is to provide a novel and improved motor-driven power steering system which can ensure smooth steering with good "road feel" without generation of irregularities of fluctuations in steering torque at all times during travel of a vehicle.

A further object of the present invention is to provide a novel and improved motor-driven power steering system which can provide smooth steering without drag or heavy steering feeling in the steering wheel even during fast steering, countersteering or the like.

A still further object of the present invention is to provide a novel and improved motor-driven power steering system in which the followability of steerable road wheels during fast steering operation can be substantially improved, thus requiring no greater steering torque than usual.

In order to achieve the above objects, according to one aspect of the present invention, there is provided a motor-driven power steering system for a vehicle comprising:

a steering wheel;

a steering shaft fixedly connected with the steering wheel for integral rotation therewith;

a speed sensor connected to detect the travelling speed of the vehicle and generating an output signal representative of the detected vehicle speed;

a torque sensor mounted on the steering shaft for detecting operator-induced steering torque resulting from steering force exerted on the steering wheel by an operator and generating an output signal representative of the detected steering torque;

a first pinion operatively connected with the steering shaft and adapted to be driven by the steering wheel through an intermediary of the steering shaft;

a rack operatively connected through tie rods with a pair of steerable road wheels and having a first rack tooth portion and a second rack tooth portion formed thereon, the first rack tooth portion being in meshing engagement with the first pinion;

a second pinion being in meshing engagement with the second rack tooth portion on the rack;

a motor operatively connected through a speed-reduction gear with the second pinion for power assisting a steering motion of the rack induced by the operator through an intermediary of the steering wheel, the steering shaft, the first pinion and the first rack tooth portion;

a first electromagnetic clutch interposed between the motor and the second pinion for transmitting power therebetween substantially in proportion to a current supplied thereto;

a second clutch interposed between the motor and the second pinion for selectively establishing or disconnecting the operative connection therebetween; and a control unit adapted to receive output signals from the speed sensor and the torque sensor for controlling the operations of the motor, the first clutch and the second clutch.

In one embodiment, the control unit comprises:

a steering-torque measuring means adapted to receive the output signal from the torque sensor for measuring the operator-induced steering torque;

a steering-torque abrupt-change judging means connected to determine abrupt changes in steering torque on the biasis of the steering torques measured presently and at a preceding time by the steering-torque measuring means;

a memory means for storing an arbitrary number of previously measured steering torques in case of normal changes in steering torque, but replacing the arbitrary number of previously measured steering torques with the precedingly measured steering torque for storing in case of abrupt changes in steering torque determined by the steering-torque abrupt-change judging means;

a steering-torque averaging means for calculating an average steering torque from the steering torques stored in the memory means;

a motor-voltage determining means for determining an appropriate level of voltage to be imposed on the motor on the basis of the steering torque measured presently;

a clutch-current determining means for determining an appropriate level of clutch current from the average steering torque calculated by the steering-torque averaging means:

a motor-voltage controlling means for controlling the voltage to be imposed on the motor on the basis of an output of the motor-voltage determining means;

a clutch-current controlling means for controlling the current to be supplied to the first clutch on the basis of an output of the clutch-current determining means; and a clutch controlling means for switching the second clutch on or off in accordance with the travelling speed of the vehicle.

In another embodiment, the control unit comprises:

a steering-torque measuring means for measuring the operator-induced steering torque on the basis of the output signal from the torque sensor;

a motor-voltage determining means for determining, from a steering torque value presently measured by the steering torque measuring means, an appropriate level of voltage to be imposed on the motor;

a motor-current measuring means for measuring the current supplied to the motor;

a motor-current judging means for judging whether or not the motor current measured by the motor-current measuring means is equal to or less than a predetermined level;

a clutch-current determining means for determining an appropriate level of current to be supplied to the first clutch in such a manner that the clutch current is decreased to zero if the motor-current judging means determines that the motor current measured is greater than the predetermined level, whereas the clutch current is determined by the measured steering torque value if it is determined that the motor current is equal to or less than the predetermined level;

a motor-voltage controlling means for controlling the voltage to be imposed on the motor on the basis of an output from the motor-voltage determining means;

a clutch-current controlling means for controlling the current flowing through the first clutch on the basis of an output of the clutch-current determining means; and a clutch controlling means for switching the second clutch on or off in accordance with the travelling speed of the vehicle.

In a further embodiment, the control unit comprises:

a steering-torque measuring means for measuring the steering torque on the basis of an output signal of the torque sensor;

a memory means for storing an arbitrary number of previously measured steering torques;

a steering-torque averaging means for calculating an average steering torque from the steering torques stored in the memory means;

a steering-direction change judging means adapted to compare a presently measured steering torque with the precedingly measured steering torque stored in the memory means for judging whether or not the steering direction has changed;

a motor-voltage determining means for determining from the presently measured steering torque an appropriate voltage to be imposed on the motor;

a clutch-current determining means for determining an appropriate current to be supplied to the first clutch in such a manner that the clutch current is decreased to zero in a predetermined period of time if the steering-direction change judging means judges that the steering direction has changed, whereas the clutch current is determined on the basis of an average steering torque calculated by the steering-torque averaging means if it is judged that the steering direction remains unchanged;

a motor-voltage controlling means for controlling the voltage to be imposed on the motor on the basis of an output from the motor-voltage determining means;

a clutch-current controlling means for controlling the current to be supplied to the first clutch on the basis of an output of the clutch-current determining means; and a clutch controlling means for switching the second clutch on or off in accordance with the travelling speed of the vehicle.

According to another aspect of the present invention, there is provided a motor-driven power steering system for a vehicle which comprises:

a steering wheel;

a steering shaft fixedly connected with the steering wheel for integral rotation therewith;

a vehicle-speed sensor for detecting the travelling speed of a vehicle and generating an output signal representative of the detected vehicle speed;

a torque sensor mounted on the steering shaft for detecting operator-induced steering torque resulting from steering force exerted on the steering wheel by an operator and generating an output signal representative of the detected steering torque;

a steering-speed sensor for detecting the steering speed of the steering wheel and generating an output signal representative of the detected steering speed;

a first pinion operatively connected with the steering shaft and adapted to be driven by the steering wheel through the intermediary of the steering shaft;

a rack operatively connected through tie rods with a pair of steerable road wheels and having a first rack tooth portion and a second rack tooth portion formed thereon, the first rack tooth portion being in meshing engagement with the first pinion;

a second pinion being in meshing engagement with the second rack tooth portion on the rack;

a motor operatively connected through a speed-reduction gear with the second pinion for power assisting steering motion of the rack induced by the operator through an intermediary of the steering wheel, the steering shaft, the first pinion and the first rack tooth portion;

a first electromagnetic clutch interposed between the motor and the second pinion for transmitting power therebetween substantially in proportion to a current supplied thereto;

a second clutch interposed between the motor and the second pinion for selectively establishing or disconnecting the operative connection between the motor and the second pinion; and a control unit adapted to receive output signals from the vehicle-speed sensor, the torque sensor and the steering-speed sensor for controlling operations of the motor, the first clutch and the second clutch.

In a further embodiment, the control unit comprises:

a steering-torque measuring means adapted to receive an output signal from the torque sensor for measuring the operator-induced steering torque;

a motor-voltage determining means for determining an appropriate voltage to be imposed on the motor from a steering torque value measured by the steering-torque measuring means;

a steering-speed of the steering wheel on the basis of an output of the steering-speed sensor;

a motor-field-current determination means for determining an appropriate field current of the motor from a steering speed measured by the steering-speed measuring means;

a clutch-current determining means for determining an appropriate current to be supplied to the first clutch on the basis of the measured steering torque value;

a motor-field-current controlling means for controlling the motor field current on the basis of an output of the motor-field-current determining means;

a motor-voltage controlling means for controlling the voltage imposed on the motor on the basis of an output of the motor-voltage determining means;

a clutch-current controlling means for controlling the current supplied to the first clutch on the basis of an output of the clutch-current determining means; and a clutch controlling means for switching the second clutch on and off in accordance with the travelling speed of the vehicle.

In a yet further embodiment, the control unit comprises:

a steering-torque measuring means adapted to receive an output signal from the torque sensor for measuring the operator-induced steering torque;

a motor-voltage determining means for determining an appropriate voltage to be imposed on the motor from a steering torque value measured by the steering-torque measuring means;

a steering-speed measuring means for measuring steering speed of the steering wheel from an output of the steering-speed sensor;

a clutch-current determining means for determing an appropriate current to be supplied to the first clutch on the basis of an output of the steering-speed measuring means in such a manner that the sliding clutch current is decreased if it is judged that the steering speed measured is greater than a predetermined level, whereas the sliding clutch current is determined by the measured steering torque if it is judged that the steering speed measured is equal to or less than the predetermined level;

a motor-voltage controlling means for controlling the voltage to be imposed on the motor on the basis of an output of the motor-voltage determining means;

a clutch-current controlling means for controlling the current supplied to the first clutch on the basis of an output of the clutch-current determining means; and a clutch controlling means for switching the first clutch on and off in accordance with the travelling speed of the vehicle.

Preferably, the first clutch is disposed between the motor and the speed-reduction clutch, and comprises an electromagnetic sliding clutch such as a powder clutch, a hysteresis clutch or the like.

Preferably, the second clutch is disposed between the speed-reduction gear and the second pinion, and comprises an electromagnetic switching clutch.

The speed-reduction gear may comprise a worm operatively connected through the first clutch with the motor and a worm wheel in meshing engagement with the worm and connected through the second clutch with the second pinion.

The above and other objects, features and advantages of the present invention will become apparent from the following detailed description of several presently preferred embodiments of the invention when taken in conjunction with the accompanying drawings.

BRIEF DESCRIPTION OF THE DRAWINGS

FIGS. 1 through 9 show a motor-driven power steering system in accordance with one embodiment of the present invention, in which FIG. 1 is a schematic view illustrating a general arrangement of the same;

FIG. 2 is a block diagram showing a control unit and its related parts;

FIG. 3 is a graphic representation showing current-/torque characteristics of a first electromagnetic clutch;

FIG. 4 is a characteristic view showing a steering-torque/motor-voltage relationship and a steering-torque/first-clutch-current relationship;

FIG. 5 is a characteristic view showing a vehicle-speed/first-clutch-current relationship and a vehicle-speed/second-clutch-voltage relationship;

FIG. 6 is a characteristic view showing delay between auxiliary torque and operator-induced steering torque over time;

FIG. 7 is a characteristic view showing delay between auxiliary torque (in case of controlling the first clutch on the basis of a simply averaged value of an arbitrary number of previously measured steering torque values) and steering torque over time;

FIG. 8 is a characteristic view showing a relationship of auxiliary torque (in case of controlling the first clutch on the basis of an average steering torque value which is appropriately determined by renewal of the contents stored in a memory means upon rapid or fast steering) to steering torque; and FIG. 9 is a flow chart showing the control processes of the power steering system of FIG. 1 as controlled by the control unit illustrated in FIG. 2.

FIGS. 18 through 23 show a motor-driven power steering system in accordance with another embodiment of the present invention, in which FIG. 18 is a schematic view illustrating a general arrangement of the same;

FIG. 19 is a block diagram showing a control unit and its related parts;

FIG. 20 is a characteristic view showing a relationship between motor field current and rpm under no load of a motor;

FIG. 21 is a characteristic view showing a relationship between the steering speed of a steering wheel and motor field current;

FIG. 22 is a characteristic view showing a relationship between motor current and steering torque, and a relationship between motor current and motor rpm; and FIG. 23 is a flow chart showing the control processes of the power steering system of FIG. 18 as controlled by the control unit illustrated in FIG. 19.

DESCRIPTION OF THE PREFERRED EMBODIMENTS

Figure 1:
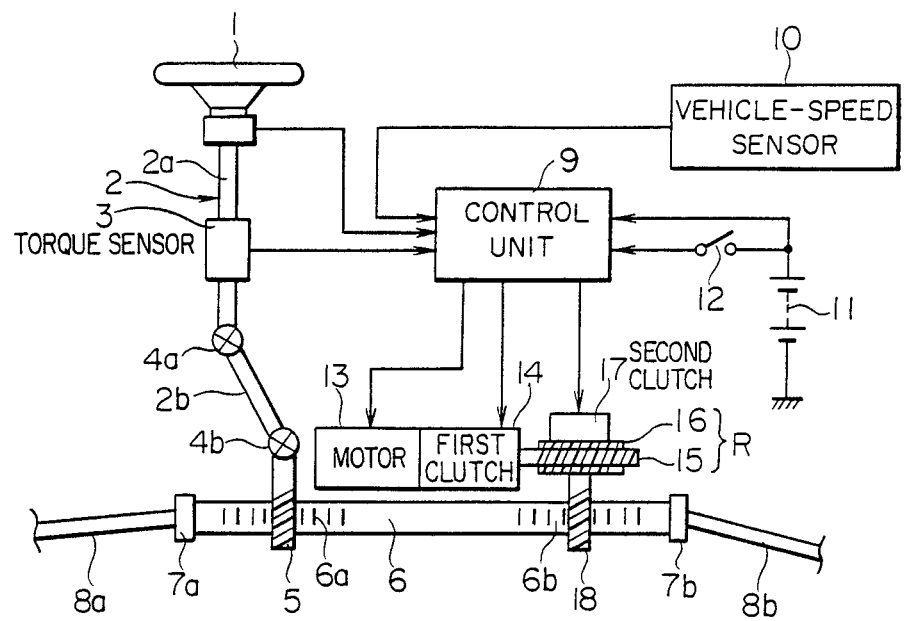

The present invention will now be described in detail with reference to several preferred embodiments thereof as illustrated in the accompanying drawings. In the following, the same parts or elements will be identified by the same reference numerals throughout the embodiments.

Referring to the drawings and first to FIGS. 1 through 9, there is shown a motor-driven power steering system for a vehicle constructed in accordance with a first embodiment of the present invention. FIG. 1 shows a general arrangement of the motor-driven power steering system which includes a steering wheel 1; a steering shaft 2 fixedly connected at its upper end with the steering wheel for integral rotation therewith; a torque sensor 3 mounted on the steering shaft 2 for detecting operator-induced steering torque resulting from steering force exerted on the steering wheel 1 by an operator and generating an electrical signal representative of the detected steering torque, the steering shaft 2 including an upper section 2a and a lower section 2b joined with each other through a first universal joint 4a; a first pinion 5 operatively connected at its upper end with the the lower end of the steering shaft 2 through a second universal joint 4b; a rack 6 operatively connected at its opposite ends through ball joints 7a, 7b with tie rods 8a, 8b which are in turn connected with a pair of steerable road wheels (not shown), the rack 6 having a first tooth portion 6a in mesh with the first pinion 5 and a second tooth portion 6b axially spaced from or otherwise continuous with the first tooth portion 6a; a vehicle-speed sensor 10 for detecting the travelling speed of a vehicle and generating an output signal representative of the detected vehicle speed; a battery 11 adapted to be mounted on the vehicle; a key or ignition switch 12; a second pinion 18 in meshing engagement with the second rack tooth portion 6b on the rack 6; a motor 13 operatively connected through a speed-reduction gear R with the second pinion 18 for power assisting the steering motion of the rack 6 induced by the operator, the motor being preferably in the form of a direct current motor having a shunt winding field or a magnetic field and adapted to be driven to rotate by the battery 11; a first electromagnetic clutch 14 interposed between the motor 13 and the second pinion 18 for transmitting power therebetween substantially in proportion to the current supplied thereto, the first clutch 14 being preferably in the form of an electromagnetic sliding clutch such as, for example, a powder clutch, a hysteresis clutch or the like and directly coupled, in thee illustrated embodiment, with an output shaft of the motor 13; a second clutch 17 in the form of an electromagnetic switching clutch interposed between the motor 13 and the second pinion 18 for selectively establishing or disconnecting an operative connection therebetween; and a control unit 9 adapted to receive output signals from the vehicle-speed sensor 10 and the torque sensor 3 for controlling the operations of the motor 13, the first and second clutches 14 and 17. In the illustrated embodiment, the speed-reduction gear R comprises a worm 15 operatively connected with an output shaft of the first sliding clutch 14, and a worm wheel 16 in the form of a nut in mesh with the worm 15. The second electromagnetic switching clutch 17 serves to mechanically couple or disconnect the worm wheel 16 with the second pinion 18.

As diagrammatically illustrated in FIG. 2, the control unit 9 comprises a steering-torque measuring means 9a adapted to receive an output signal from the torque sensor 3 for measuring the operator-induced steering torque, a steering-torque abrupt-change judging means 9b adapted to judge an abrupt or rapid change in steering torque from a steering torque presently measured by the steering torque-measuring means 9b and a steering torque measured at a preceding time by the steering-torque measuring means 9b, a memory means 9c for storing an arbitrary number of measured steering torques in case of normal changes in steering torque, but replacing the arbitrary number of the measured steering torques with the precedingly measured steering torque for storing in case of abrupt changes in steering torque as judged by the steering-torque abrupt-change judging means 9b; a steering-torque averaging means 9d for averaging the steering torques stored in the memory means 9c, a motor-voltage determining means 9e for determining an appropriate voltage to be imposed on the motor 13 on the basis of the presently measured steering torque, a clutch-current determining means 9f for determining an appropriate clutch current from an average steering torque value calculated by the steering-torque averaging means 9d, a motor-voltage controlling means 9g for controlling the voltage to be imposed on the motor 13 on the basis of an output from the motor-voltage determining means 9e, a clutch-current controlling means 9h for controlling the current flowing through the first electromagnetic sliding clutch 14 on the basis of an output of the clutch-current determining means 9f; and a clutch controlling means 9i for switching the second electromagnetic switching clutch 17 on and off in accordance with the travelling speed of the vehicle.

Now, the operation of the power steering system of this embodiment will be described with reference to FIGS. 1 through 9. First, the case in which a vehicle is stationary or standing still will be considered. In this case, when the key switch 12 is first turned on to start the engine, the electromagnetic clutch 17 is automatically actuated to place the second pinion 18 into mechanical coupling with the worm wheel 16. In this state, when the steering wheel 1 is turned by an operator, the control unit 9 acts to control the operations of the motor 13 and the sliding clutch 14 in the manner as illustrated in FIG. 4 which shows a relationship between steering torque, motor voltage and clutch current. In this regard, it is to be noted that the steering torque as shown in FIG. 4 is an input steering torque periodically received when controlling the motor 13, or is an average torque when controlling the sliding clutch 14. More specifically, when steering torque increases in the righthand direction to point a in FIG. 4, the motor 13 is turned on and then imposed with 100% voltage at point b. As the steering torque further increases, current begins to flow through the electromagnetic clutch 14 at point c and the the current increases in a logarithmic relation with respect to an increase in the steering torque, and reaches 100% current at point d. On the other hand, as the steering torque decreases, current flowing through the electromagnetic sliding clutch 14 begins to decrease at point d and reaches 0% current at point c. In accordance with a further decrease in the steering torque, the motor 13 is turned off at point e so that the voltage imposed on the motor 13 becomes 0% at point f. Similar to this, the motor 13 and the electromagnetic sliding clutch 14 are controlled in the same manner when the steering torque increases or decreases in the lefthand direction.

Figure 3:
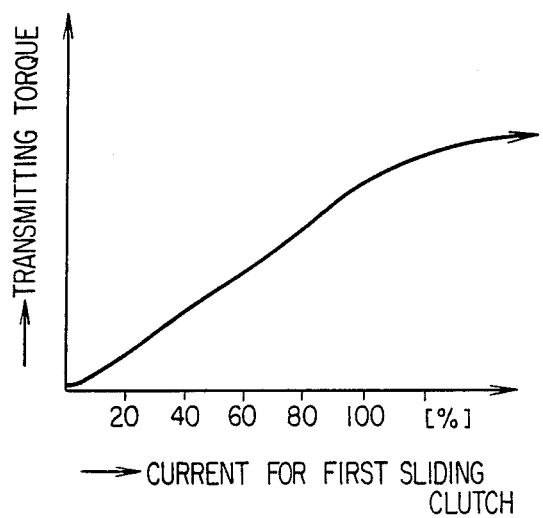
Figure 4:
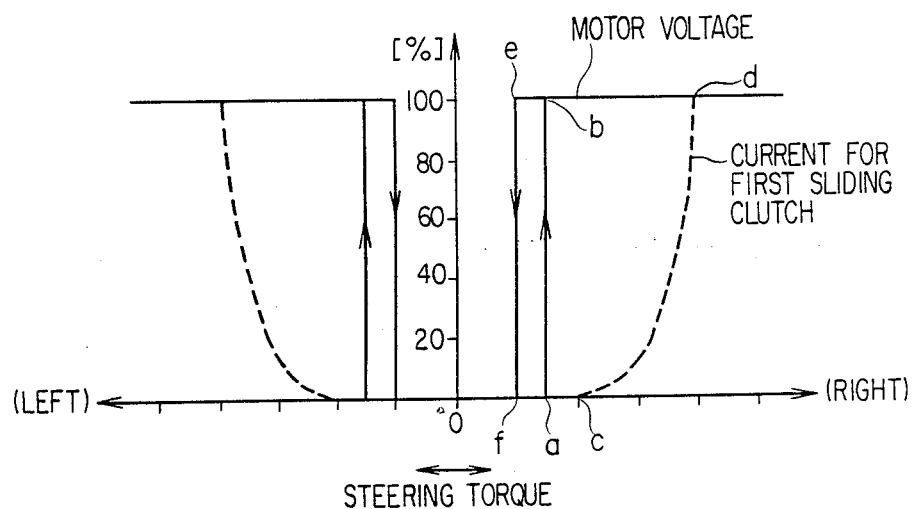

As shown in FIG. 3, the characteristic of the sliding clutch 14 is used in a range in which transmitting torque or sliding torque increases substantially in direct proportion to clutch current. Accordingly, as is clear from FIG. 4, the motor 13 is imposed with 100% voltage and energized to start rotating when steering torque increases to point a. As the steering torque further increases, current flowing through the sliding clutch 14 begins to gradually increase at point c so that the output torque transmitted from the sliding clutch 14 to the worm 15 increases gradually. As a result, auxiliary torque having an intensity corresponding to the turning force exerted on the steering wheel by an operator is transmitted from the motor 13 to the second tooth portion 6b on the rack 6 via the sliding clutch 14, the worm wheel 16, the electromagnetic clutch 17 and the second pinion 18, thereby lightening the steering operation for the operator.

Figure 6:
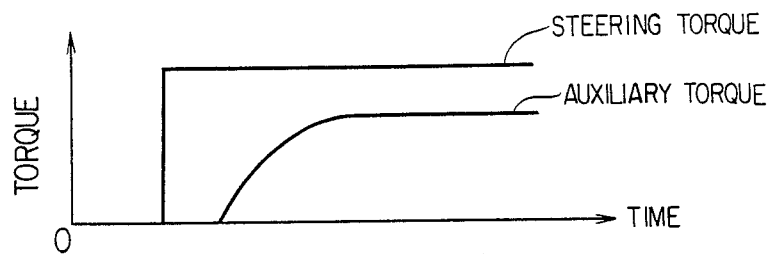
Figure 7:
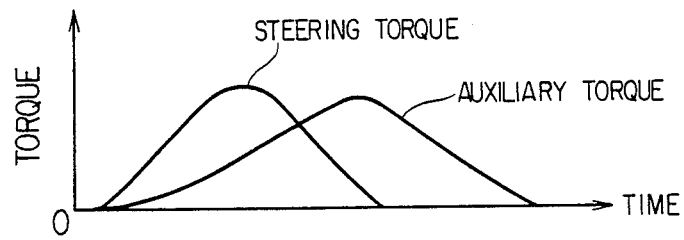
Figure 8:
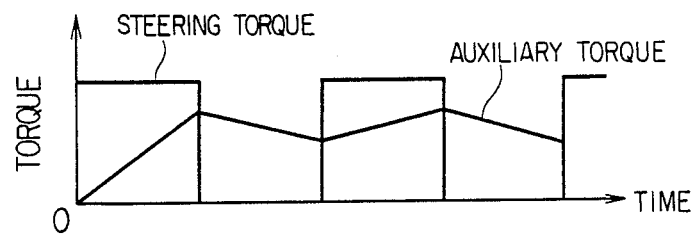
Figure 9:
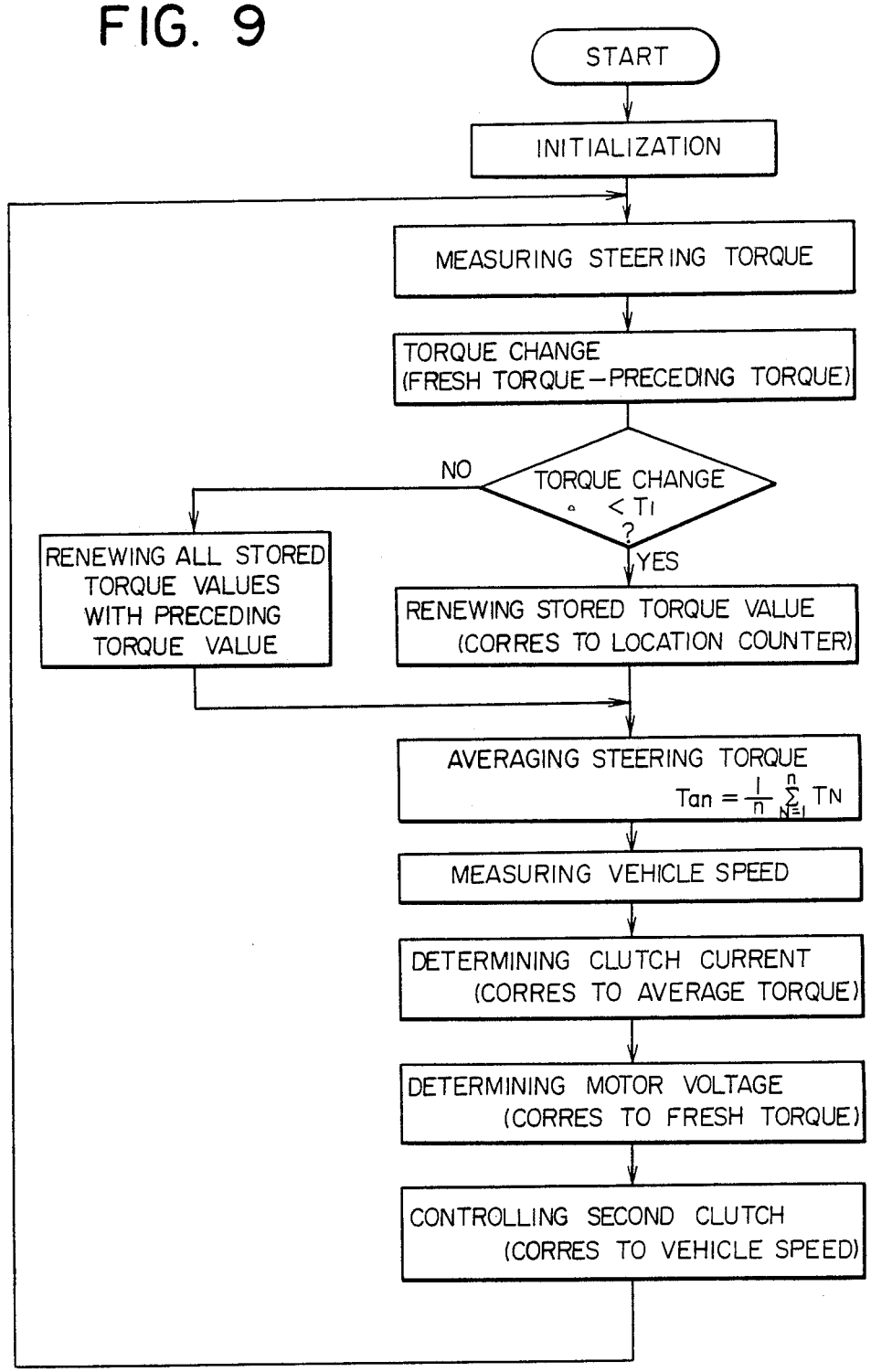

Although the above operation of the power steering system is in a static state, in the actual dynamic operation of the system, there will usually be a time lag until power assist to the operator-induced steering is initiated due to time lags occurring at various stages during torque transmission between various component elements such as the motor 13, the first sliding clutch 14, the worm 15, the worm wheel 16 and the like, as depicted in FIG. 6. This Figure illustrates a change in time lag of auxiliary or assisting torque with respect to operator-induced steering torque over time. Such a time lag tends to cause vibrations in the power steering system. However, in order to cope with this problem, if the sliding clutch 14 is controlled in the manner as shown in FIG. 4 on the basis of an average of an appropriate number of previously measured steering torques as illustrated in FIG. 7, the vibration cycle is merely lengthened, but it is impossible to suppress the system vibrations themselves. In view of this, according to this embodiment, as illustrated in FIGS. 8 and 9, instead of simply averaging an arbitrary number of previously measured steering torques, all of the arbitrary number of previous steering torques stored are replaced with a preceding steering torque precedingly measured and then averaged if the input steering torques periodically stored change with respect to the preceding torque in excess of a predetermined value $T_1$ (that is an abrupt or rapid torque-change judging value). Using the average torque thus obtained, auxiliary torque or power-assisting torque changes much more gradually than the operator-induced steering torque, as is clear from FIG. 8, and in case of a sudden change in the operator-induced steering torque, the auxiliary torque immediately changes following such an operator-induced steering torque change, thereby preventing vibrations in the steering system. On the other hand, in order to make the direction of the auxiliary torque consistent with that of the operator-induced steering torque, the motor 13 is controlled on the basis of input steering torques periodically stored.

Now, the case in which the vehicle is travelling will be considered. In this case, as seen from FIG. 5, current flowing through the first sliding clutch 14 is controlled by the control unit 9 so that it decreases in inverse proportion to an increase in vehicle speed. Thus, the sliding clutch current becomes 0% at point g in FIG. 5. That is, even if steering force is exerted on the steering wheel 1 by an operator, current flowing through the first sliding clutch 14 becomes zero. On the other hand, when the vehicle speed increases to point h in FIG. 5, the second electromagnetic clutch 17 is deactuated or turned off so that the engagement or mechanical coupling between the worm wheel 16 and the second pinion 18 is released or disconnected. As a consequence, when turning the steering wheel 1, the operator only feels a load which is caused by the meshing engagement between the second rack tooth 6b and the second pinion 18. In other words, the steering system simply becomes a manual steering without power assistance. On the contrary, when the vehicle speed decreases, the control unit 9 operates such that the electromagnetic clutch 17 is actuated or turned on at point h to provide mechanical coupling between the second pinion 18 and the worm wheel 16, and then the current to be applied to the second sliding clutch 14 is gradually increased from point g.

In this connection, it is to be noted that in cases where the steering system suffers some electrical problems, for example, where wiring for the vehicle-speed sensor 10 and/or the torque sensor 3 short out, or wiring from the battery 11 fails, or the sliding clutch 14 or the motor 13 locks up, the control unit 9 operates to turn off the second electromagnetic clutch 17 thereby to return the steering system to manual steering without power assist, thus providing safety in operation.

Although in the above-described embodiment, input steering torque periodically received are stored by the memory means 9c, contents of the control outputs corresponding to the respective input torque values as shown in FIG. 4 may be stored and averaged so as to control the operation of the power steering system.

Figure 10:
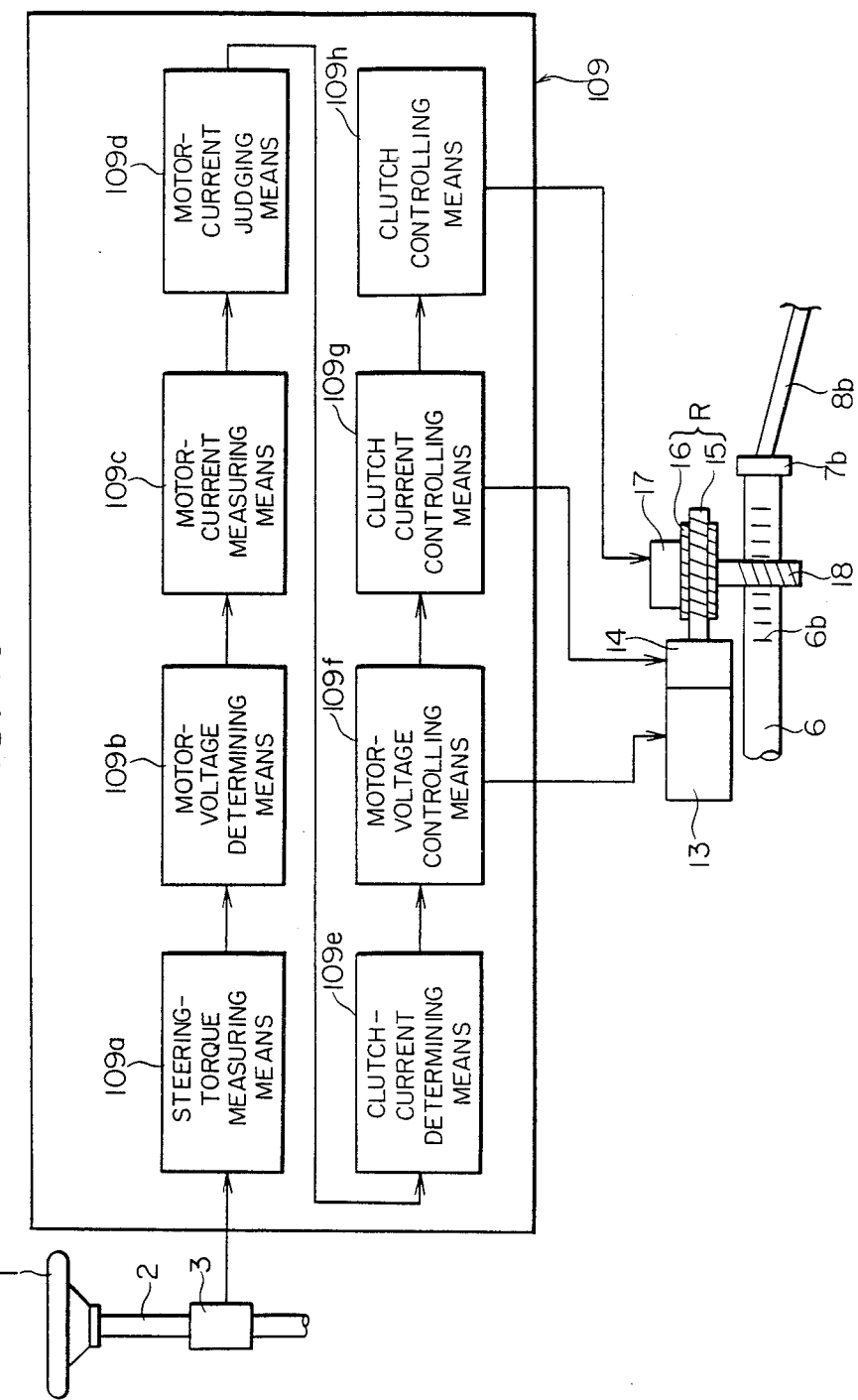
FIG. 10 is a view similar to FIG. 2, showing a modified form of a control unit for use with the power steering system of FIG. 1.
Figure 11:
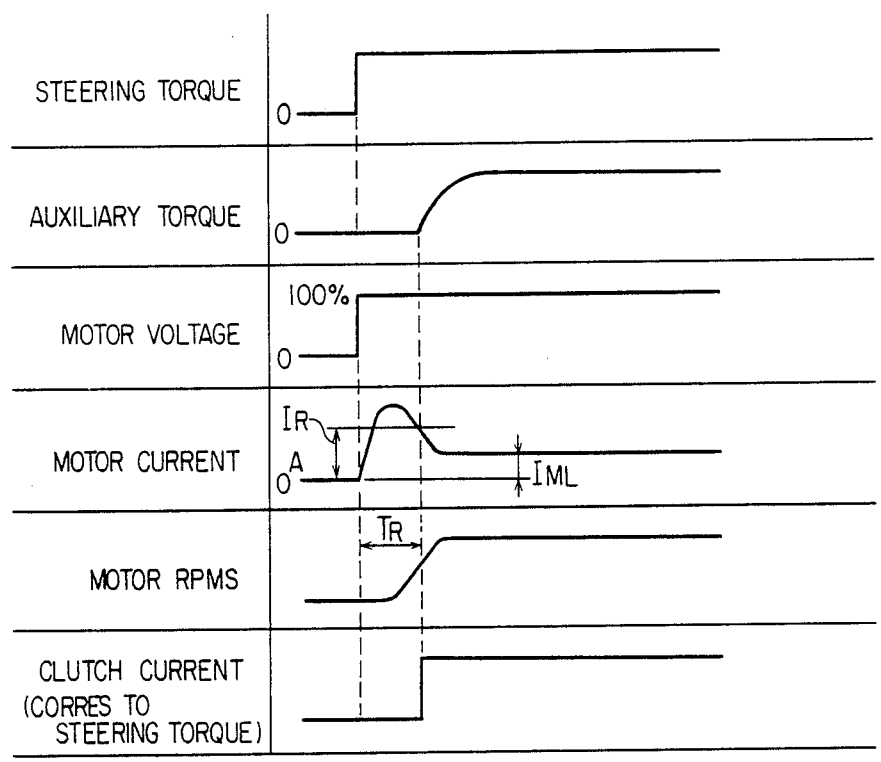
FIG. 11 is a timing chart showing changes with time of various factors as controlled by the control unit of FIG. 10.
Figure 12:
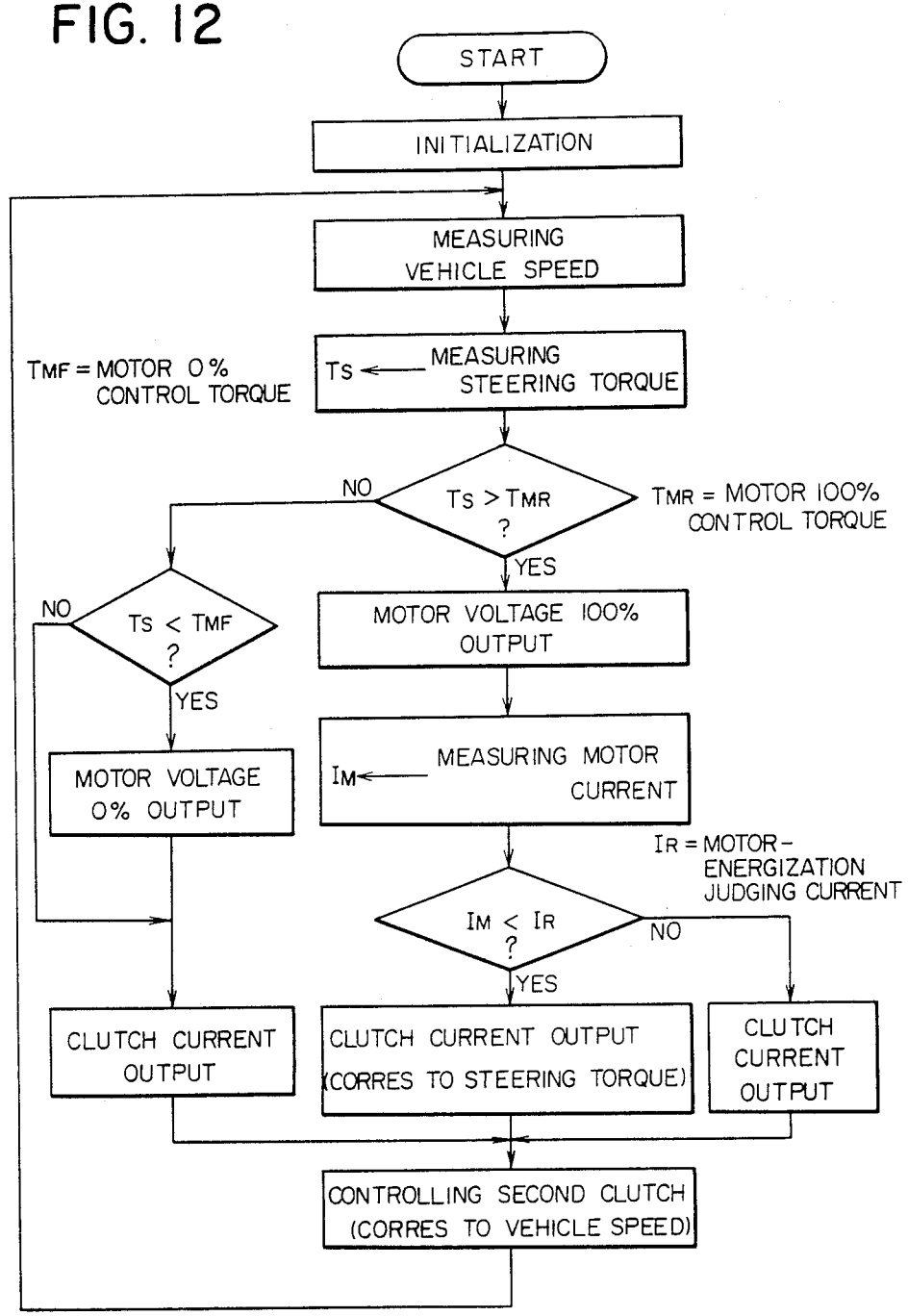
FIG. 12 is a flow chart showing the control processes of the power steering system of FIG. 1 as controlled by the control unit of FIG. 10.

FIGS. 10 through 12 show another embodiment of a control unit 109 for use with the power steering system illustrated in FIG. 1 in accordance with the present invention. In this embodiment, as illustrated in FIG. 10, the control unit 109 comprises a steering-torque measuring means 109a adapted to receive an output signal from the torque sensor 3 for measuring the operator-induced steering torque, a motor-voltage determining means 109b for determining an appropriate voltage to be imposed on the motor 13 from a steering torque presently measured by the steering-torque measuring means 109a, a motor-current measuring means 109c for measuring the current supplied to the motor 13, a motor-current judging means 109d for judging whether or not the motor current measured by the motor-current measuring means 109c is equal to or less than a predetermined level, a clutch-current determining means 109e for determining an appropriate current to be supplied to the first electromagnetic sliding clutch 14 in such a manner that the sliding clutch current is decreased to zero if the motor-current judging means 109d judges that the motor current measured is greater than the predetermined level, whereas the sliding clutch current is determined by the measured steering torque if it is judged that the motor current measured is equal to or less than the predetermined level, a motor-voltage controlling means 109f for controlling the voltage imposed on the motor 13 on the basis of an output of the motor-voltage determining means 109b, a clutch-current controlling means 109g for controlling the current supplied to the first sliding clutch 14 on the basis of an output of the clutch-current determining means 109e, and an electromagnetic-clutch controlling means 109h for switching the second electromagnetic clutch 17 on and off in accordance with the travelling speed of the vehicle.

In operation, the control unit 109 as constructed above operates to control the power steering system in the manner as shown in the flow chart of FIG. 12. More specifically, the static operation of the power steering system under the control of this control unit 109 is substantially the same as that controlled by the control unit 9 as previously referred to with reference to FIGS. 2 through 4. However, the actual dynamic operation of the power steering system according to this embodiment is as follows. As illustrated in the timing chart in FIG. 11, a period of time $T_R$ (for example, about 50 ns in the illustrated embodiment) is required from the instant when the motor 13 is imposed with an appropriate voltage until the rpms of the motor 13 rise to a predetermined level so that if the first sliding clutch 14 is connected within such a period $T_R$, the motor 13 becomes a load with respect to the operator-induced steering torque, thus giving rise to a heavy or dragging feeling imparted to the operator particularly upon rapid or quick steering or countersteering operations. Accordingly, in this case, unpleasant or poor steering feeling results. In order to cope with this, according to this embodiment, as shown in FIGS. 11 and 12, current is not supplied to the sliding clutch 14 until motor current increases above and then decreases below a prescribed level $I_R$ which is less than a motor energizing current (i.e., a peak value of the motor current in FIG. 11) but larger than a normal operating current $I_{ML}$ (a flat and constant level of the motor current in FIG. 11), even if turning force or steering torque is imparted by an operator to the steering wheel 1. This serves to eliminate the dragging feeling upon rapid or quick steering or countersteering operations. On the other hand, when the motor current decreases below the prescribed level $I_R$, auxiliary torque or power-assisting torque offered by the motor 13 is controlled in accordance with the operator-induced steering torque, as illustrated in FIG. 4. In this manner, good and smooth steering feeling can be obtained at all times without any substantial increase in cost.

Figure 5:
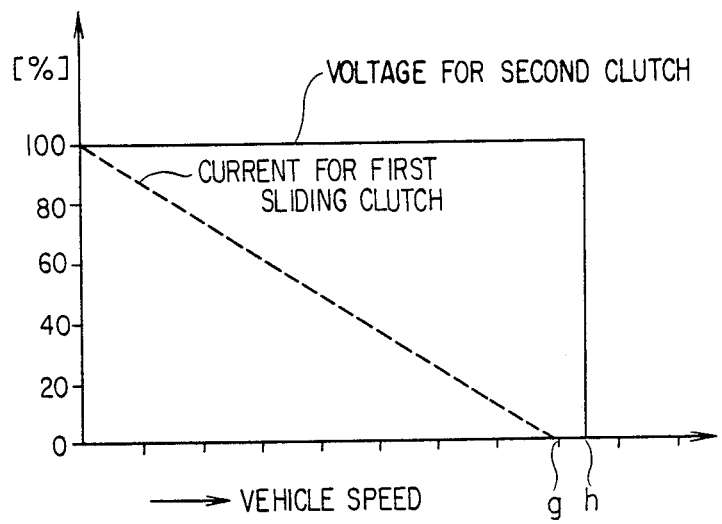

Further, it should be noted that during travel of a vehicle, current to be supplied to the first sliding clutch 14 and the second electromagnetic clutch 17 is controlled by the control unit 109 in the same manner as referred to with respect to the control unit 9 and illustrated in FIG. 5.

Figure 13:
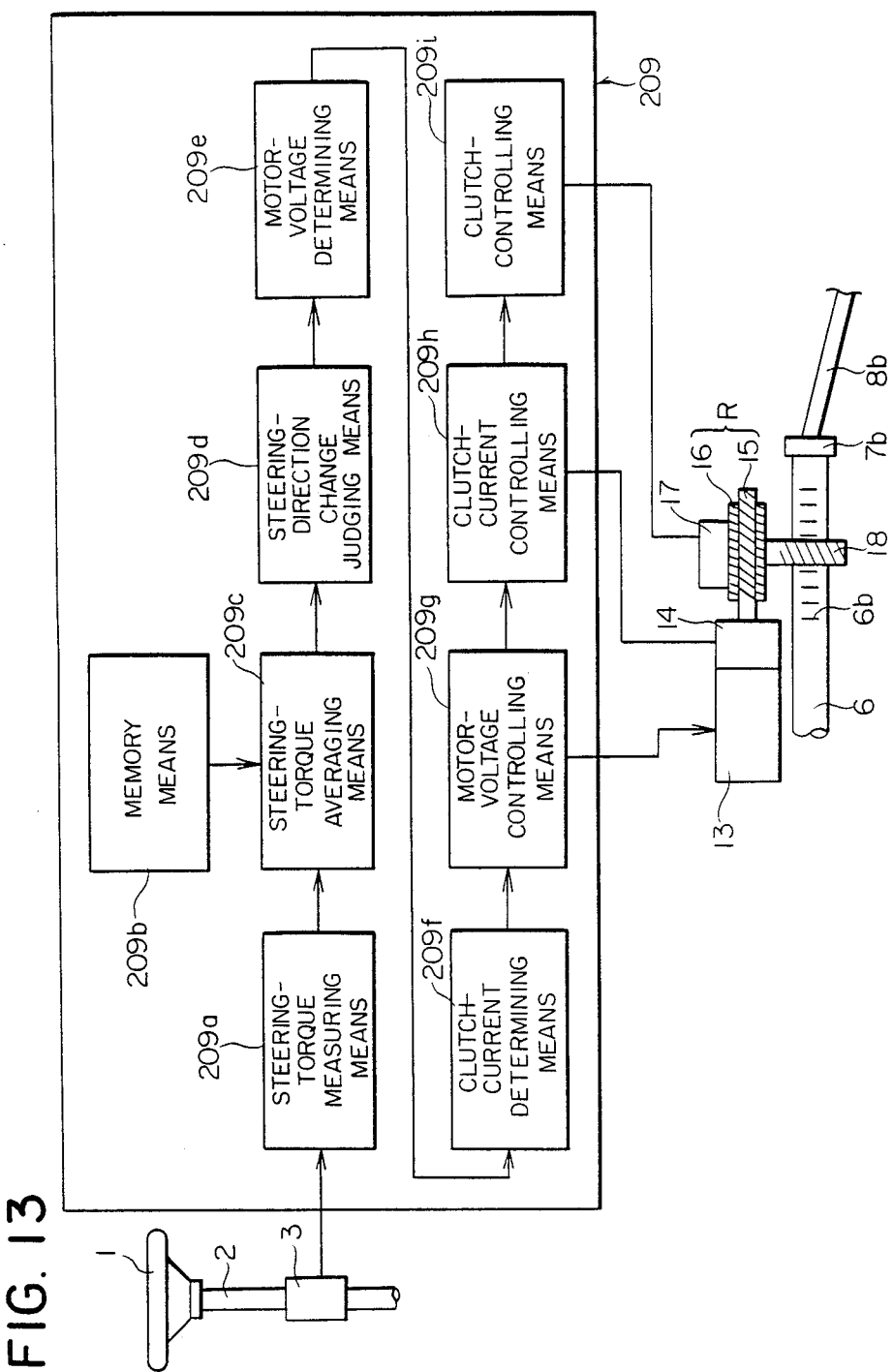
FIG. 13 is a view similar to FIG. 2, showing another modified form of a control unit for use with the power steering system of FIG. 1.

FIGS. 13 through 17 show a further embodiment of a control unit 209 adapted for use with the power steering system illustrated in FIG. 1 in accordance with the present invention. In this embodiment, as illustrated in FIG. 13, the control unit 209 comprises a steering-torque measuring means 209a for measuring the steering torque on the basis of the output of the steering-torque sensor 3, a memory means 209b for storing an arbitrary number of previously measured steering torques, a steering-torque averaging means 209c for averaging the steering torques stored in the memory means 209b, a steering-direction change judging means 209d adapted to compare a measured steering torque and the precedingly measured steering torque stored in the memory means 209b for judging whether or not the steering direction has changed, a motor-voltage determining means 209e for determining from the presently measured steering torque an appropriate voltage to be imposed on the motor 13, a clutch-current determining means 209f for determining an appropriate current to be supplied to the first sliding clutch 14 in such a manner that the clutch current is decreased to zero in a predetermined period of time if the steering-direction change judging means 209d judges that the steering direction has changed, whereas the clutch current is determined on the basis of an average steering torque calculated by the steering-torque averaging means 209c if it is judged that the steering direction remains unchanged, a motor-voltage controlling means 209g for controlling the voltage to be imposed on the motor 13 on the basis of an output from the motor-voltage determining means 209e, a clutch-current controlling means 209h for controlling the current flowing through the first electromagnetic sliding clutch 14 on the basis of an output of the clutch-current determining means 209f, and a clutch controlling means 209i for switching the second electromagnetic clutch 17 on and off in accordance with the travelling speed of the vehicle.

Figure 14:
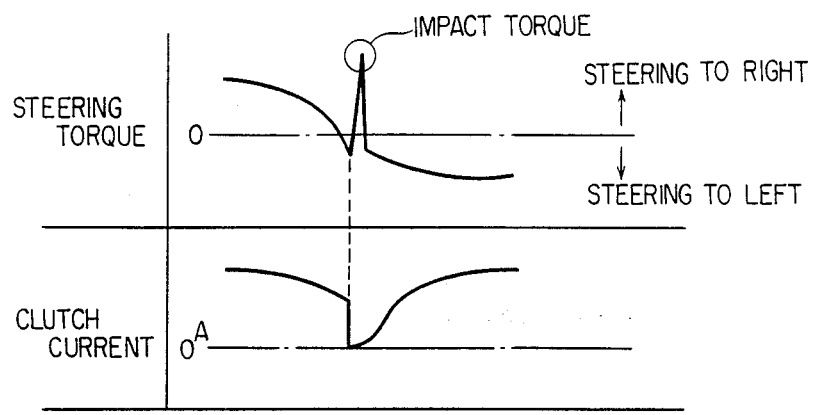
FIG. 14 is a timing chart showing generation of impact torque.
Figure 15:
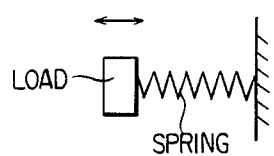
FIG. 15 is an explanatory view illustrating the principle of how impact torque is generated.
Figure 16:
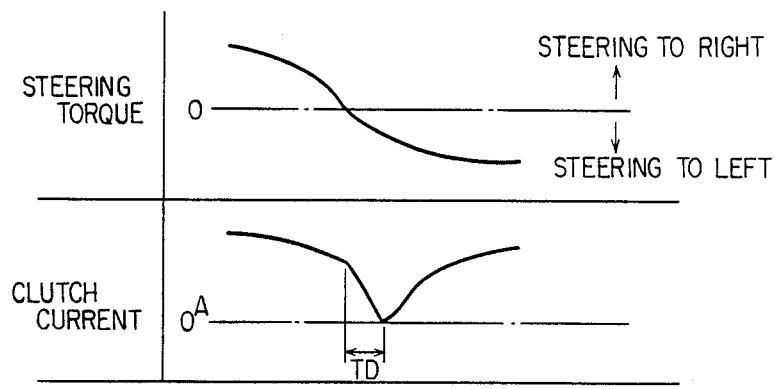
FIG. 16 is a timing chart illustrating clutch current control for preventing generation of impact torque.
Figure 17:
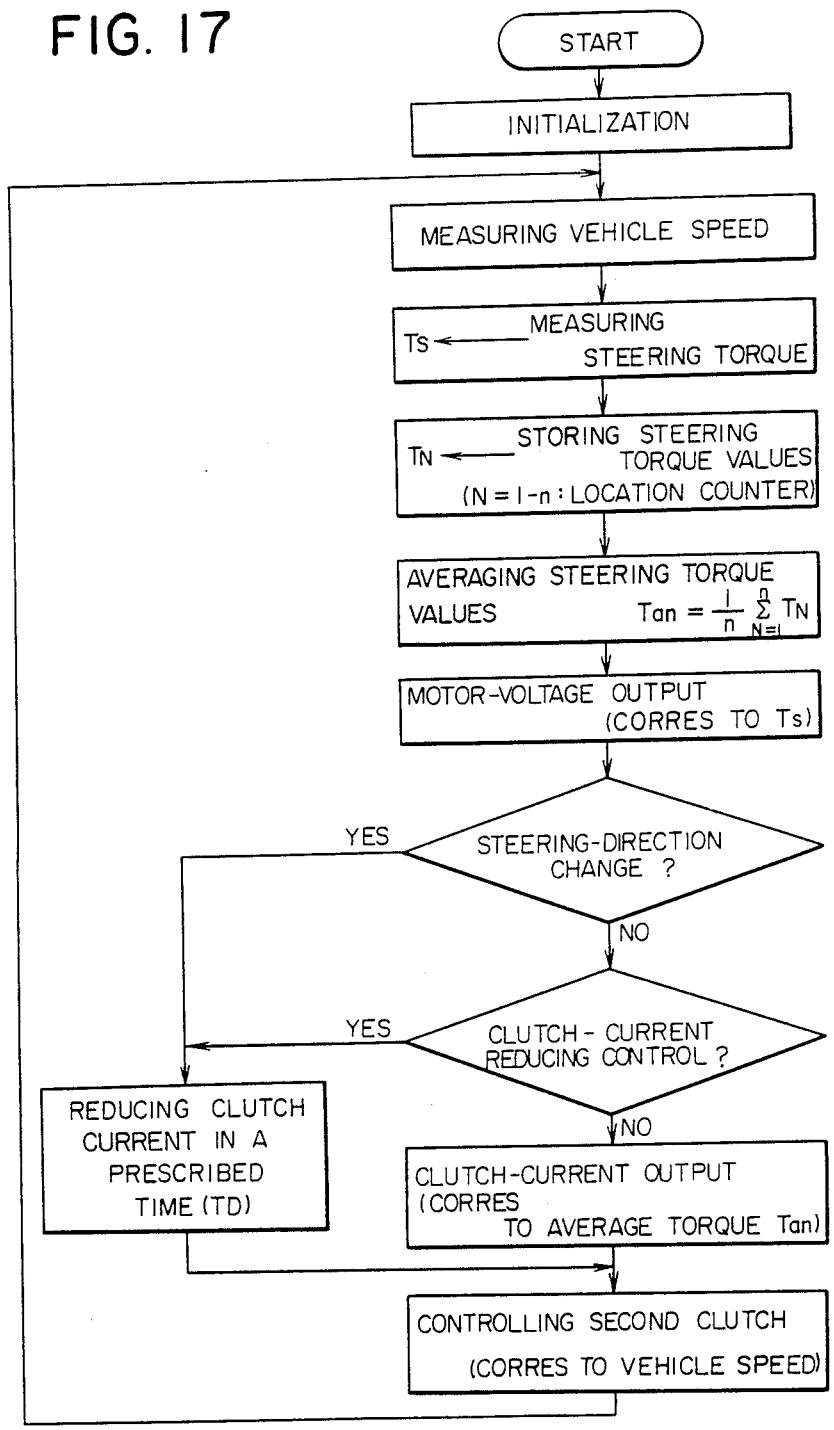
FIG. 17 is a flow chart showing the control processes of the power steering system of FIG. 1 as controlled by the control unit of FIG. 13.

The control unit 209 of this embodiment operates to control the power steering system shown in FIG. 1 in the manner as illustrated in the flow chart of FIG. 13. Thus, the operation of the power steering system controlled by the control unit 209 is substantially the same as that as controlled by the control unit 9 illustrated in FIG. 2 except for the following. Specifically, as illustrated in FIG. 14, when the direction of steering or steering torque has changed, the current to be supplied to the sliding clutch 14 is decreased to zero so as to prevent occurrence of a dragging feeling on the part of an operator due to the inertia of the motor 13. In this case, however, if such clutch current is decreased to zero rapidly, for example, in 50 ns, there will be impact torque and noise based on the same principle as when a compressive load imposed on a spring is released rapidly, as schematically depicted in FIG. 15. In order to avoid this situation, as shown in the timing chart for controlling the clutch current in FIG. 16 and also in a flow chart in FIG. 17, the control unit 209 operates to control the clutch current such that the clutch current is decreased to zero in a prescribed period of time $T_D$ (for example, 50–300 ns), instead of being rapidly decreased immmediately upon change in direction of the steering torque. As a result, rapid release of the spring-like system can be effectively prevented, thus avoiding generation of impact torque and noise as well. On the other hand, the motor 13 is controlled on the basis of measured steering torques periodically received so as to make the direction of auxiliary or assisting torque consistent with the direction of steering torque. In this manner, it is possible to take an appropriate measure against impact noise generated from impact torque by means of a control program incorporated in the control unit 209 without changing the arrangement and/or construction of the component members of the power steering system so that a power steering system with good steering feeling can be provided at low cost.

Figure 18:
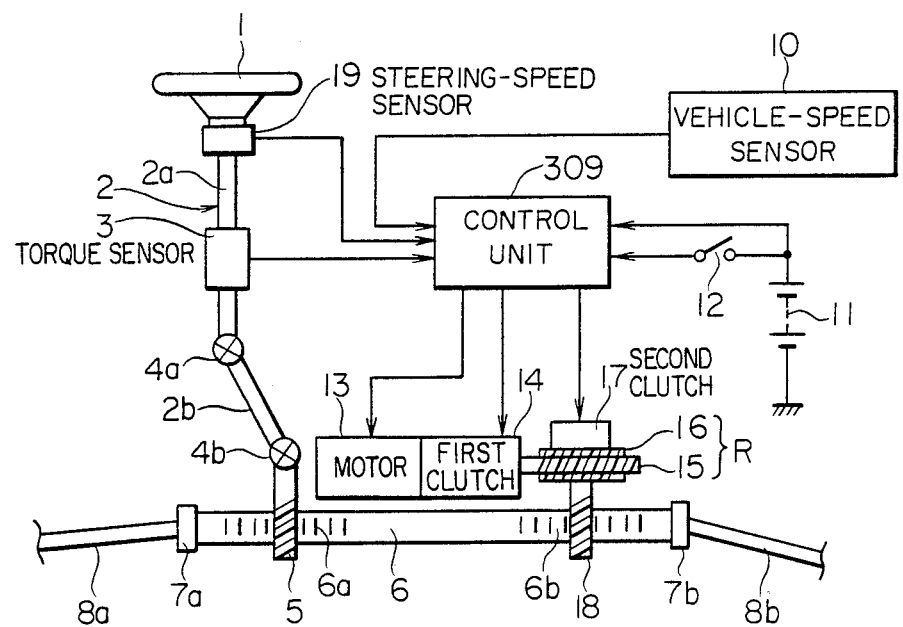
Figure 19:
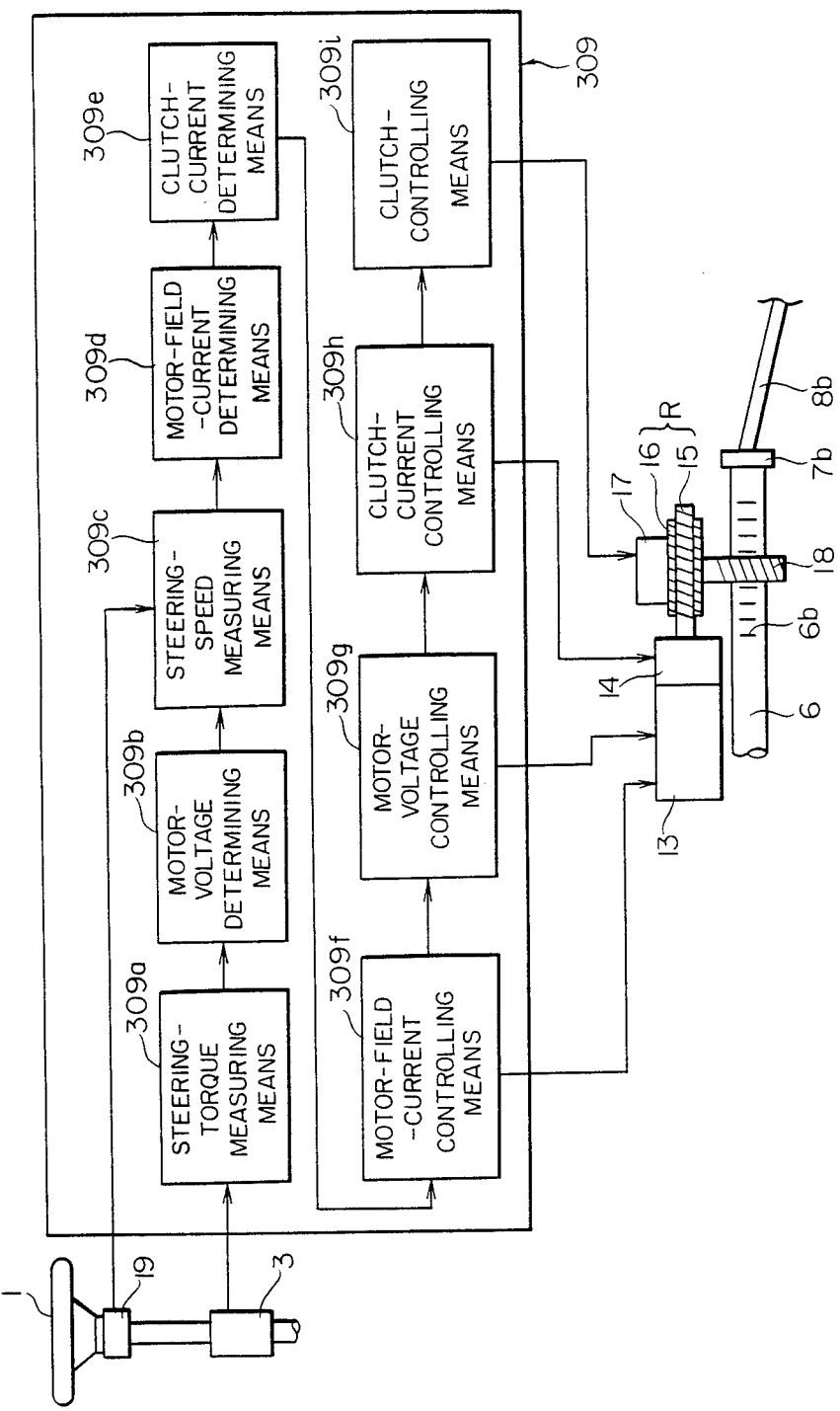
Figure 20:
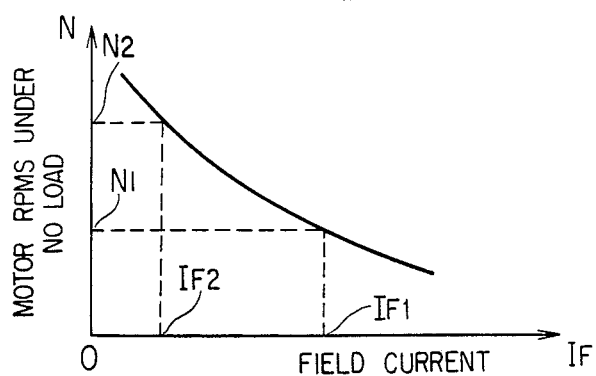

FIGS. 18 through 23 show a power steering system in accordance with another embodiment of the present invention. The power steering system illustrated in FIG. 18 is substantially similar in construction to that in FIG. 1 except that in addition to all the component parts of the FIG. 1 embodiment, it includes a steering-speed sensor 19 for detecting the steering speed of the steering wheel 1 and generating an output signal representative of a detected steering speed, and that a control unit 309 of this embodiment is constructed such that it is adapted to receive output signals from the vehicle-speed sensor, the torque sensor 3 and the steering-speed sensor 19 for controlling the operations of the motor 13, the first clutch 14 and the second clutch 17. Specifically, in this embodiment, as illustrated in FIG. 19, the control unit 309 comprises a steering-torque measuring means 309a adapted to receive an output signal from the torque sensor 3 for measuring the operator-induced steering torque, a motor-voltage determining means 309b for determining an appropriate voltage to be imposed on the motor 13 from a steering torque value measured by the steering-torque measuring means 309a, a steering-speed measuring means 309c for measuring the steering speed of the steering wheel 1 on the basis of an output of the steering-speed sensor 19, a motor-field-current determining means 309d for determining an appropriate field current of the motor 13 from a steering speed measured by the steering-speed measuring means 309c, a clutch-current determining means 309e for determining an appropriate current to be supplied to the first electromagnetic sliding clutch 14 on the basis of the measured steering torque value, a motor-field-current controlling means 309f for controlling the motor field current on the basis of an output of the motor-field-current determining means 309d, a motor-voltage controlling means 309g for controlling the voltage imposed on the motor 13 on the basis of an output of the motor-voltage determining means 309b, a clutch-current controlling means 309h for controlling the current supplied to the first sliding clutch 14 on the basis of an output of the clutch-current determining means 309e, and a clutch controlling means 309i for switching the second electromagnetic clutch 17 on or off in accordance with the travelling speed of the vehicle.

Figure 21:
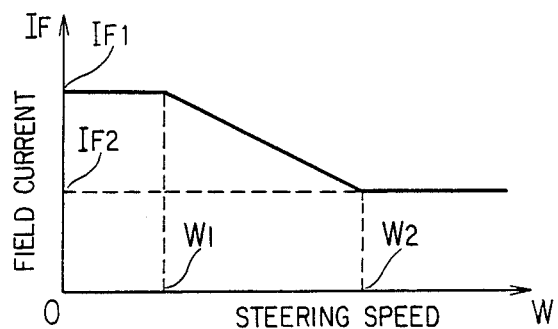
Figure 22:
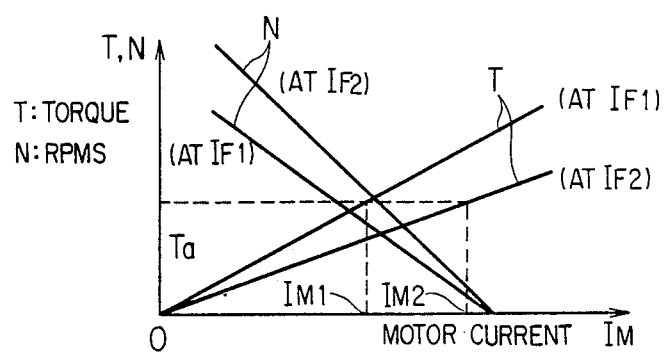
Figure 23:
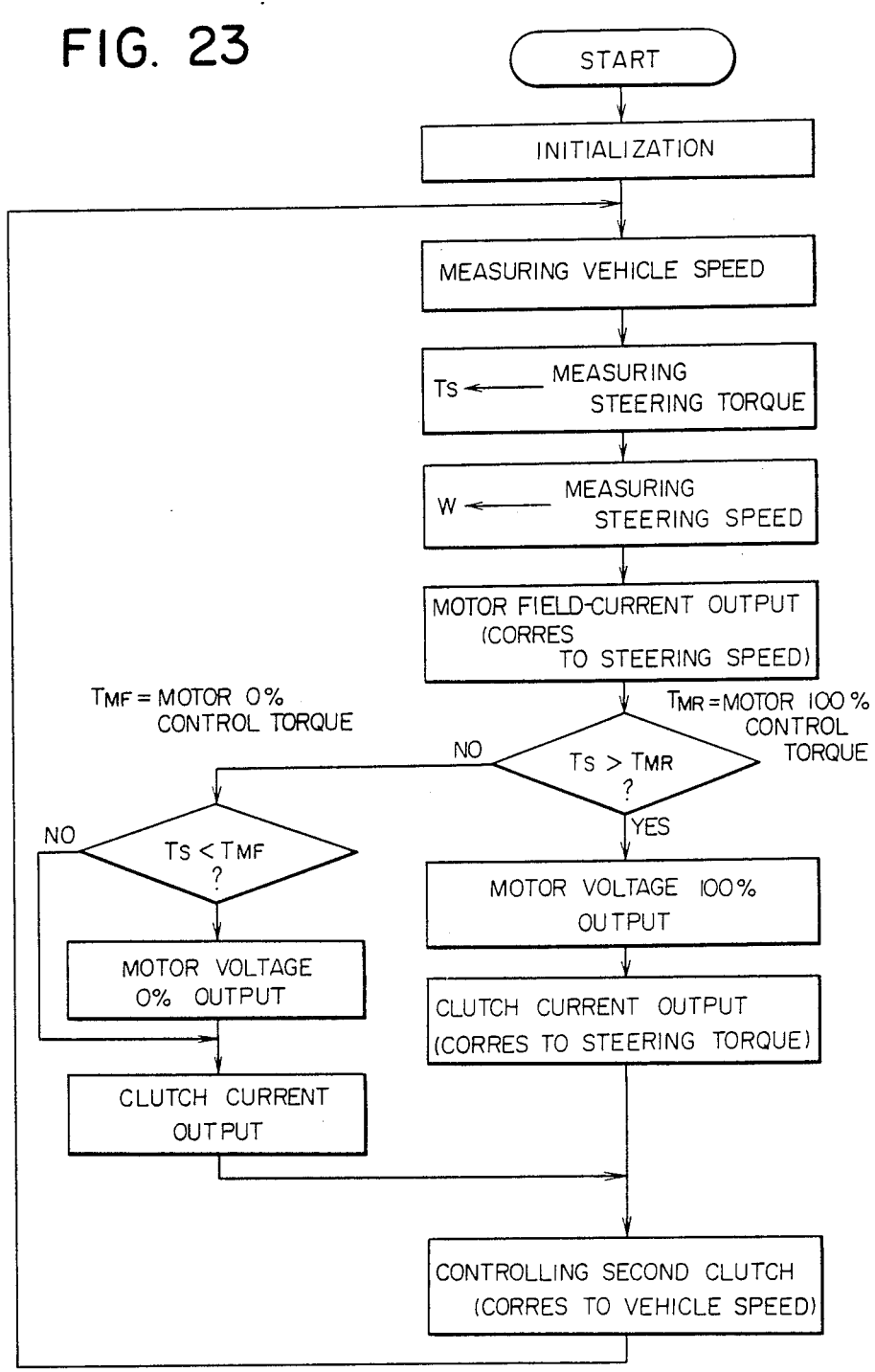

The control unit 309 of this embodiment operates to control the power steering system in the manner as illustrated in the flow chart of FIG. 23. Thus, the operation of the power steering system controlled by the control unit 309 is substantially the same as that as controlled by the control unit 9 illustrated in FIG. 2 except for the following. Specifically, in case of rapid or quick turning of the steering wheel 1, the steering torque induced by an operator generally becomes greater than the auxiliary or assisting torque produced by the motor 13 operating under no load so that the operator feels a heaviness in the steering wheel 1 that is not present when it is turned slowly. To avoid this, according to this embodiment, as illustrated in a characteristic relation between the motor field current and the rpms under no load of the motor 13 in FIG. 20, in a control relation between the steering speed of the steering wheel 1 and the motor field current in FIG. 21, and in the flow chart of FIG. 23, the control unit 309 operates to control the field current of the motor 13 in a manner as shown in FIG. 21 such that at the time of fast steering operation, the motor field current is decreased from a first higher level $I_{F1}$ to a second lower level $I_{F2}$ in accordance with an increase in the steering speed thereby to increase the rpms under no load of the motor 13 to a level $N_2$. As a result, the fast-steering followability is materially improved. In fact, the followability during fast steering is made $N_2/N_1$ times higher than when the motor field current is fixed or held constant at $I_{F1}$ as in the prior art. Further, by making the motor field current variable from $I_{F1}$ to $I_{F2}$ for the same level of steering torque in accordance with the steering speed, as illustrated in FIG. 22, the motor current as required during slow steering can be reduced from $I_{M2}$ to $I_{M1}$, thereby providing good followability in steering even with smaller motor current. Accordingly, it is possible to avoid the unfavorable situation of overloading the battery.

Figure 24:
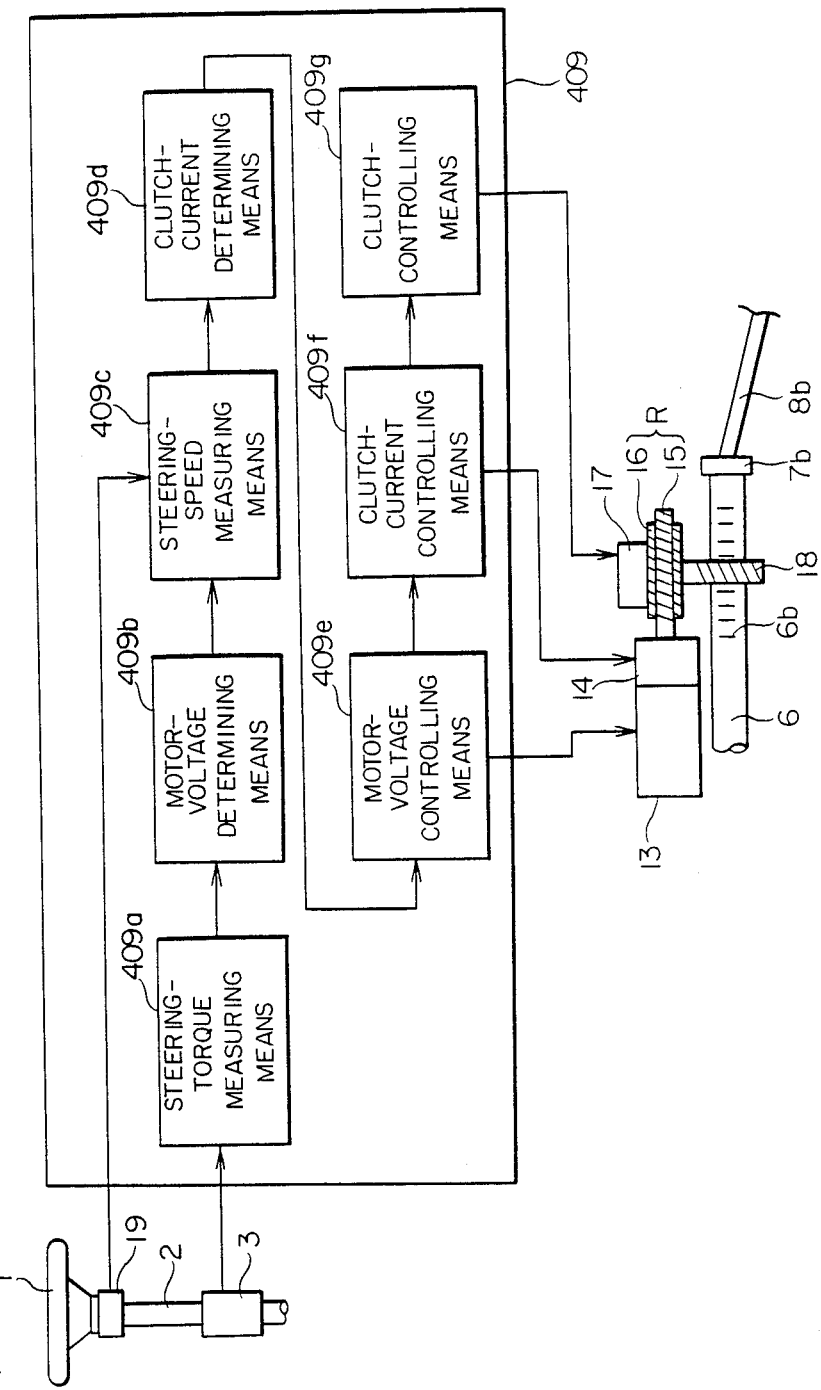
FIG. 24 is a view similar to FIG. 19, showing a modified form of a control unit for use with the power steering system of FIG. 18.
Figure 25:
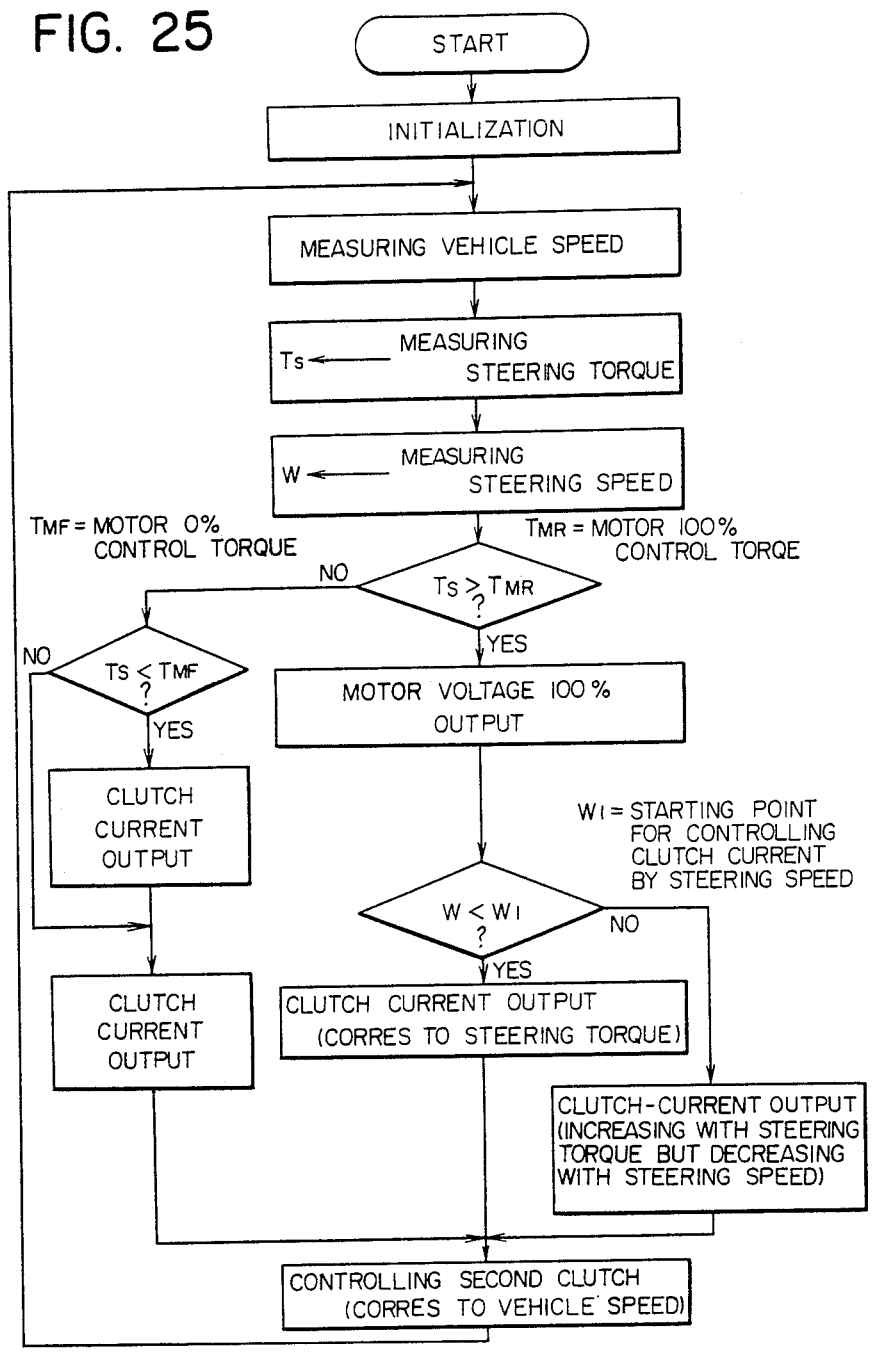
FIG. 25 is a flow chart showing the control processes of the power steering system of FIG. 18 as controlled by the control unit of FIG. 24.

FIGS. 24 and 25 show a further embodiment of a control unit 409 adapted for use with the power steering system illustrated in FIG. 18 in accordance with the present invention. As illustrated in FIG. 24, the control unit 409 comprises a steering-torque measuring means 409a adapted to receive an output signal from the torque sensor 3 for measuring the operator-induced steering torque, a motor-voltage determining means 409b for determining an appropriate voltage to be imposed on the motor 13 from a steering torque value measured by the steering-torque measuring means 409a, a steering-speed measuring means 409c for measuring the steering speed of the steering wheel 1 from an output of the steering-speed sensor 19, a clutch-current determining means 409d for determining an appropriate current to be supplied to the first electromagnetic sliding clutch 14 on the basis of an output of the steering-speed measuring means 409c in such a manner that the sliding clutch current is decreased if it is judged that the steering speed measured is greater than a predetermined level, whereas the sliding clutch current is determined by the measured steering torque if it is judged that the steering speed measured is equal to or less than the predetermined level, a motor-voltage controlling means 409e for controlling the voltage to be imposed on the motor 13 on the basis of an output of the motor-voltage determining means 409b, a clutch-current controlling means 409f for controlling the current supplied to the sliding clutch 14 on the basis of an output of the clutch-current determining means 409d, and a clutch controlling means 409g for switching the second electromagnetic clutch 17 on or off in accordance with the travelling speed of the vehicle.

The control unit 409 of this embodiment operates to control the power steering system in the manner as illustrated in the flow chart of FIG. 25. Thus, the operation of the power steering system controlled by the control unit 409 is substantially the same as that as controlled by the control unit 9 illustrated in FIG. 2 except for the following. Specifically, in case of rapid or quick turning of the steering wheel 1, the steering torque induced by an operator generally becomes greater than the auxiliary or assisting torque produced by the motor 13 operating under no load so that the operator feels a heaviness in the steering wheel 1 that is not present when it is turned slowly. To avoid this, according to this embodiment, as illustrated in the flow chart of FIG. 25, the current supplied to the first sliding clutch 14 is controlled to decrease in accordance with an increase in the steering speed so that the motor 13 is disconnected from the rack 6 when the steering speed of the steering wheel 1 exceeds a predetermined level $W_1$. As a result, the motor 13 is not loaded at the time of fast steering operaton, thereby avoiding the situation that the steering wheel 1 becomes heavier during fast steering than manual steering without any power assist. Thus, a power steering system having good followability during fast steering can be obtained simply by adding a steering speed sensor to a conventional power steering system and appropriately changing the control program of the control unit.

What is claimed is:

1. A motor-driven power steering system for a vehicle comprising:
    a steering wheel;
    a steering shaft fixedly connected with said steering wheel for integral rotation therewith;
    a speed sensor connected to detect travelling speed of the vehicle and generating an output signal representative of the detected vehicle speed;
    a torque sensor mounted on said steering shaft for detecting operator-induced steering torque resulting from steering force exerted on said steering wheel by an operator and generating an output signal representative of the detected steering torque;
    a first pinion operatively connected with said steering shaft and adapted to be driven by said steering wheel through an intermediary of said steering shaft;
    a rack operatively connected through tie rods with a pair of steerable road wheels and having a first rack tooth portion and a second rack tooth portion formed thereon, said first rack tooth portion being in meshing engagement with said first pinion;
    a second pinion being in meshing engagement with said second rack tooth portion on said rack;
    a motor operatively connected through a speed-reduction gear with said second pinion for power assisting a steering motion of said rack induced by the operator through an intermediary of said steering wheel, said steering shaft, said first pinion, and said first rack tooth portion;
    a first electromagnetic clutch interposed between said motor and said second pinion for transmitting power therebetween substantially in proportion to a current suplied thereto;
    a second clutch interposed between said motor and said second pinion for selectively establishing and disconnecting the operative connection therebetween; and
    a control unit adapted to receive output signals from said speed sensor and said torque sensor for controlling the operations of said motor, said first clutch, and said second clutch.

2. A motor-driven power steering system according to claim 1 wherein said first clutch is disposed between said motor and said speed-reduction clutch.

3. A motor-driven power steering system according to claim 2 wherein said second clutch is disposed between said speed-reduction gear and said second pinion.

4. A motor-driven power steering system according to claim 3 wherein said second clutch comprises an electromagnetic switching clutch.

5. A motor-driven power steering system according to claim 1 wherein said first clutch comprises an electromagnetic sliding clutch.

6. A motor-driven power steering system according to claim 5 wherein said electromagnetic sliding clutch comprises a powder clutch.

7. A motor-driven power steering system according to claim 5 wherein said electromagnetic sliding clutch comprises a hysteresis clutch.

8. A motor-driven power steering system according to claim 1 wherein said speed-reduction gear comprises a worm operatively connected through said first clutch with said motor and a worm wheel connected through said second clutch with said second pinion.

9. A motor-driven power steering system according to claim 1 wherein said control unit comprises:
    a steering-torque measuring means adapted to receive the output signal from said torque sensor for measuring the operator-induced steering torque;
    a steering-torque abrupt-change judging means connected to determine an abrupt change in steering torque on the basis of a steering torque presently measured and a preceding steering torque measured at a preceding time by said steering-torque measuring means;
    a memory means for storing an arbitrary number of previously measured steering torques in case of normal changes in steering torque, but replacing the arbitrary number of said previously measured steering torques with said precedingly measured steering torque for storing in case of an abrupt change in steering torque as determined by said steering-torque abrupt-change judging means;
    a steering-torque averaging means for calculating an average steering torque from the steering torques stored in said memory means;
    a motor-voltage determining means for determining an appropriate voltage to be imposed on said motor on the basis of the steering torque measured presently;
    a clutch-current determining means for determining an appropriate clutch current from an average steering torque calculated by said steering-torque averaging means;
    a motor-voltage controlling means for controlling the current to be supplied to said first clutch on the basis of an output of said clutch-current determining means; and a clutch controlling means for switching said second clutch on and off in accordance with the travelling speed of the vehicle.

10. A motor-driven power steering system according to claim 1 wherein said control unit comprises:

a steering-torque measuring means for measuring the operator-induced steering torque on the basis of the output signal of said torque sensor;

a motor-voltage determining means for determining, from a steering torque measured presently by said steering torque measuring means, an appropriate voltage to be imposed on said motor;

a motor-current measuring means for measuring the current supplied to said motor;

a motor current judging means for determining whether the motor current measured by said motorcurrent measuring means is equal to or less than a predetermined level;

a clutch-current determining means for determining an appropriate current to be supplied to said first clutch in such a manner that the clutch current is decreased to zero if said motor-current judging means determines that the motor current measured is greater than the predetermined level, whereas the clutch current it determined by the measured steering torque if it is determined that the motor current is equal to or less than the predetermined level;

a motor-voltage controlling means for controlling the current to be supplied to the first clutch on the basis of an output of said clutch-current determining means; and a clutch controlling means for switching said second clutch on and off in accordance with the travelling speed of the vehicle.

11. A motor-driven power steering system according to claim 1 wherein said control unit comprises:

a steering-torque measuring means for measuring the steering torque on the basis of an output signal of said torque sensor;

a memory means for storing an arbitrary number of previously measured steering torques;

a steering-direction change judging means adapted to compare a presently measured steering torque with the preceding measured steering torque stored in said memory means for judging whether the steering direction has changed;

a motor-voltage determining means for determining from the presently measured steering torque an appropriate voltage to be imposed on said motor;

a clutch-current determining means for determining an appropriate current to be supplied to said first clutch in such a manner that the clutch current is decreased to zero in a predetermined period of time if said steering-direction change judging means judges that the steering direction has changed, whereas the clutch current is determined on the basis of an average steering torque calculated by said steering-torque averaging means if it is judged that the steering direction remains unchanged;

a motor-voltage controlling means for controlling the current to be supplied to said first clutch on the basis of an output of said clutch-current determining means; and a clutch controlling means for switching said second clutch on and off in accordance with the travelling speed of the vehicle.

12. A motor-driven power steering system for a vehicle comprising:

a steering wheel;

a steering shaft fixedly connected with said steering wheel for integral rotation therewith;

a vehicle-speed sensor connected to detect travelling speed of the vehicle and generating an output signal representative of the detected vehicle speed;

a torque sensor mounted on said steering shaft for detecting operator-induced steering torque resulting from steering force exerted on said steering wheel by an operator and generating an output signal representative of the detected steering torque;

a steering-speed sensor for detecting the steering speed of said steering wheel and generating an output signal representative of the detected steering speed;

a first pinion operatively connected with said steering shaft and adapted to be driven by said steering wheel through an intermediary of said steering shaft;

a rack operatively connected through tie rods with a pair of steerable road wheels and having a first rack tooth portion and a second rack tooth portion formed thereon, said first rack tooth portion being in meshing engagement with said first pinion;

a second pinion being in meshing engagement with said second rack tooth portion on said rack;

a motor operatively connected through a speed-reduction gear with said second pinion for power assisting the steering motion of said rack induced by the operator through an intermediary of said steering wheel, said steering shaft, said first pinion, and said first rack tooth portion;

a first electromagnetic clutch interposed between said motor and said second pinion for transmitting power therebetween substantially in proportion to a current supplied thereto;

a second clutch interposed between said motor and said second pinion for selectively establishing and disconnecting the operative connection therebetween; and a control unit adapted to receive output signals from said speed sensor, said torque sensor, and said steering-speed sensor for controlling the operations of said motor, said first clutch, and said second clutch.

13. A motor-driven power steering system according to claim 12 wherein said first clutch is disposed between said motor and said speed-reduction clutch.

14. A motor-driven power steering system according to claim 13 wherein said second clutch is disposed between said speed-reduction gear and said second pinion.

15. A motor-driven power steering system according to claim 14 wherein said second clutch comprises an electromagnetic switching clutch.

16. A motor-driven power steering system according to claim 12 wherein said first clutch comprises an electromagnetic sliding clutch.

17. A motor-driven power steering system according to claim 16 wherein said electromagnetic sliding clutch comprises a powder clutch.

18. A motor-driven power steering system according to claim 16 wherein said electromagnetic sliding clutch comprises a hysteresis clutch.

19. A motor-driven power steering system according to claim 12 wherein said speed-reduction gear comprises a worm operatively connected through said first clutch with said motor and a worm wheel connected through said second clutch with said second pinion.

20. A motor-driven power steering system according to claim 12 wherein said control unit comprises:
- a steering-torque measuring means adapted to receive the output signal from said torque sensor for measuring the operator-induced steering torque;
- a motor-voltage determining means for determining an appropriate voltage to be imposed on said motor from the steering torque measured by said steering-torque measuring means;
- a steering-speed measuring means for measuring the steering speed of said steering wheel on the basis of an output of said steering-speed sensor;
- a motor-field-current determining means for determining an appropriate field current of said motor from a steering speed measured by said steering-speed measuring means;
- a clutch-current determining means for determining an appropriate current to be supplied to said first clutch on the basis of the measured steering torque value;
- a motor-field-current controlling means for controlling the motor field current on the basis of an output of said motor-field-current determining means;
- a motor-voltage controlling means for controlling the voltage imposed on said motor on the basis of an output of said motor-voltage determining means;
- a clutch-current controlling means for controlling the current supplied to said first clutch on the basis of an output of the clutch-current determining means; and
- a clutch controlling means for switching said second clutch on or off in accordance with the travelling speed of the vehicle.

21. A motor-driven power steering system according to claim 12 wherein said control unit comprises:
- a steering-torque measuring means adapted to receive an output signal from said torque sensor for measuring the operator-induced steering torque;
- a motor-voltage determining means for determining an appropriate voltage to be imposed on said motor from a steering torque measured by said steering-torque measuring means;
- a steering-speed measuring means for measuring the steering speed of said steering wheel from an output of said steering-speed sensor;
- a clutch-current determining means for determining an appropriate current to be supplied to said first clutch on the basis of an output of said steering-speed measuring means in such a manner that the sliding clutch current is decreased if it is judged that the steering speed measured is greater than a predetermined level, whereas the sliding clutch current is determined by the measured steering torque if it is judged that the steering speed measured is equal to or less than the predetermined level;
- a motor-voltage controlling means for controlling the voltage to be imposed on said motor on the basis of an output of said motor-voltage determining means;
- a clutch-current controlling means for controlling the current supplied to said first clutch on the basis of an output of said clutch-current determining means; and
- a clutch controlling means for switching said first clutch on or off in accordance with the travelling speed of the vehicle.

* * * * *